US011278095B1

United States Patent
Chan et al.

(10) Patent No.: US 11,278,095 B1
(45) Date of Patent: Mar. 22, 2022

(54) CASE FOR PORTABLE ELECTRONIC COMPUTING DEVICE

(71) Applicant: Pioneer Square Brands, Inc., Seattle, WA (US)

(72) Inventors: Jaimie Emerald Chan, Renton, WA (US); Michael Cooper Ferren, Camas, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 13 days.

(21) Appl. No.: 17/207,605

(22) Filed: Mar. 20, 2021

Related U.S. Application Data

(63) Continuation-in-part of application No. 17/156,572, filed on Jan. 23, 2021.

(51) Int. Cl.
*A45C 11/00* (2006.01)
*G06F 1/16* (2006.01)
*A45C 13/10* (2006.01)

(52) U.S. Cl.
CPC .......... *A45C 11/00* (2013.01); *A45C 13/103* (2013.01); *G06F 1/1628* (2013.01); *A45C 2011/003* (2013.01)

(58) Field of Classification Search
CPC ... A45C 13/02; A45C 11/00; A45C 2011/003; A45C 2013/025; A45C 13/03; A45C 2013/1061; A45C 13/1038; G06F 1/1628

USPC ........................................................ 206/320
See application file for complete search history.

(56) References Cited

U.S. PATENT DOCUMENTS

| 6,264,029 | B1 * | 7/2001 | Motson ................. | A45C 11/00 206/320 |
| 10,499,719 | B2 * | 12/2019 | Chan ..................... | H04B 1/3888 |
| D897,092 | S | 9/2020 | Chan et al. | |
| 2003/0029754 | A1 * | 2/2003 | Scicluna ................. | A45F 5/00 206/320 |
| 2004/0173482 | A1 * | 9/2004 | Nieves ................. | A45C 11/00 206/320 |
| 2005/0072691 | A1 * | 4/2005 | Schlansky ............ | G06F 1/1626 206/232 |
| 2012/0037523 | A1 * | 2/2012 | Diebel ................... | B65D 85/00 206/320 |

\* cited by examiner

*Primary Examiner* — Rafael A Ortiz
(74) *Attorney, Agent, or Firm* — Grandview Law

(57) ABSTRACT

Systems and methods are involved with but are not limited to a portable device case including a frictional component coupled to a tensional retention assembly, the frictional component having a coefficient of friction greater than the coefficient of friction of a first clip, a second clip, and a tensional member of the tensional retention assembly. In addition to the foregoing, other aspects are described in the claims, drawings, and text forming a part of the present disclosure.

14 Claims, 20 Drawing Sheets

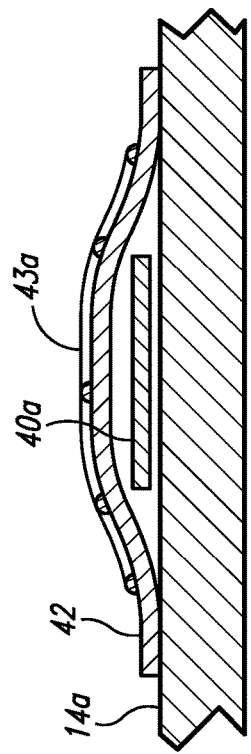
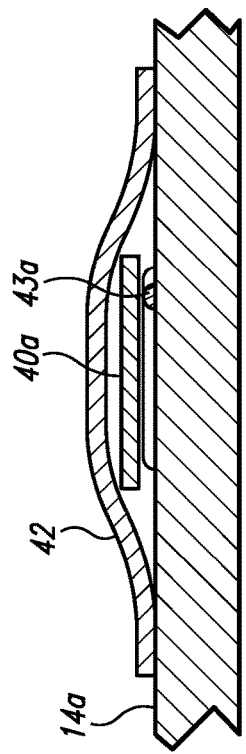
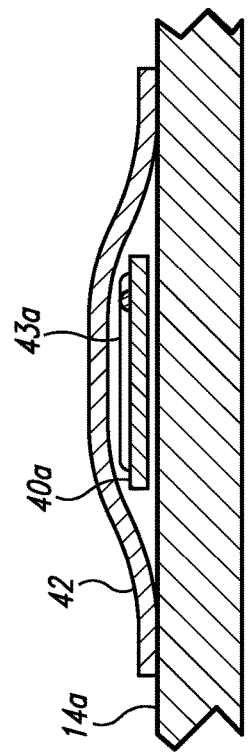
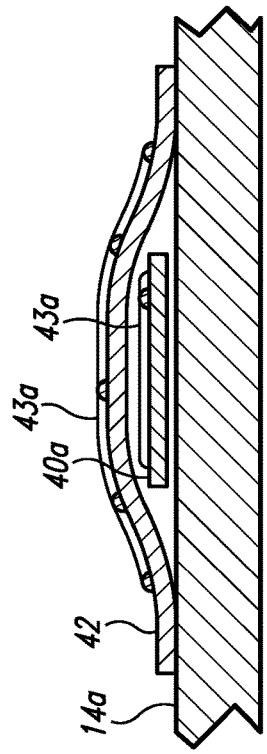
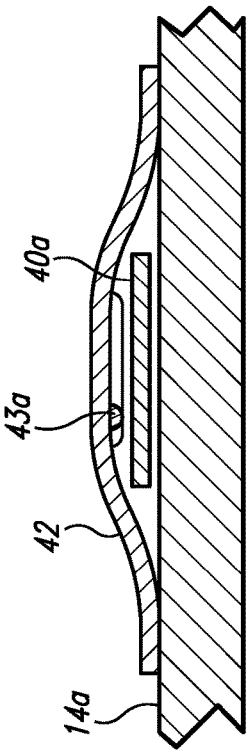
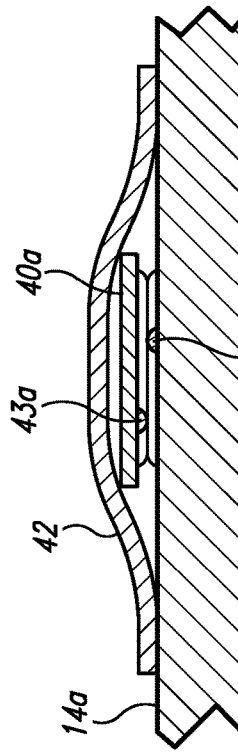

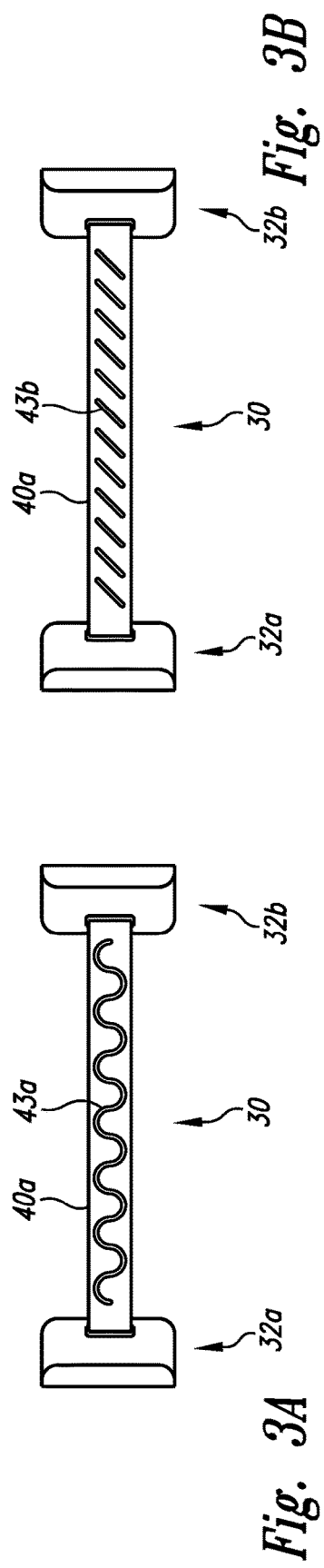
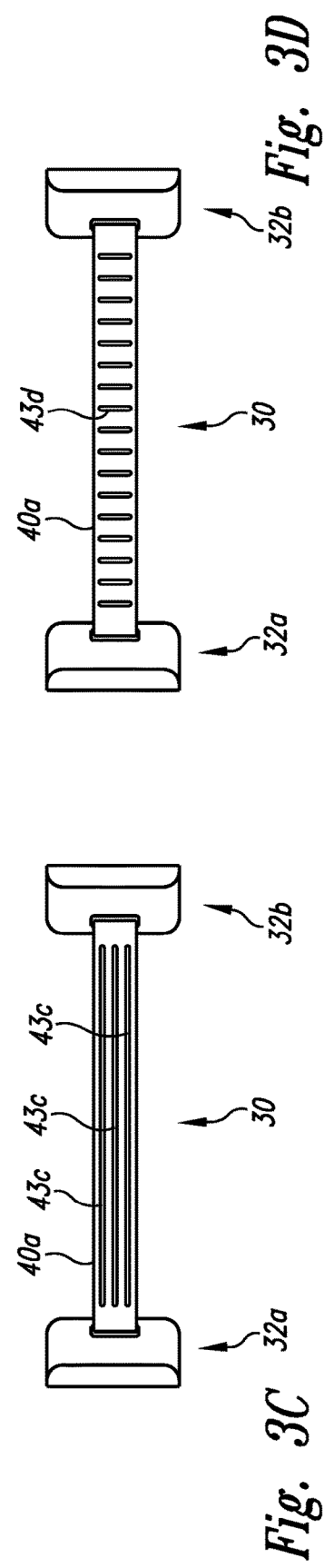
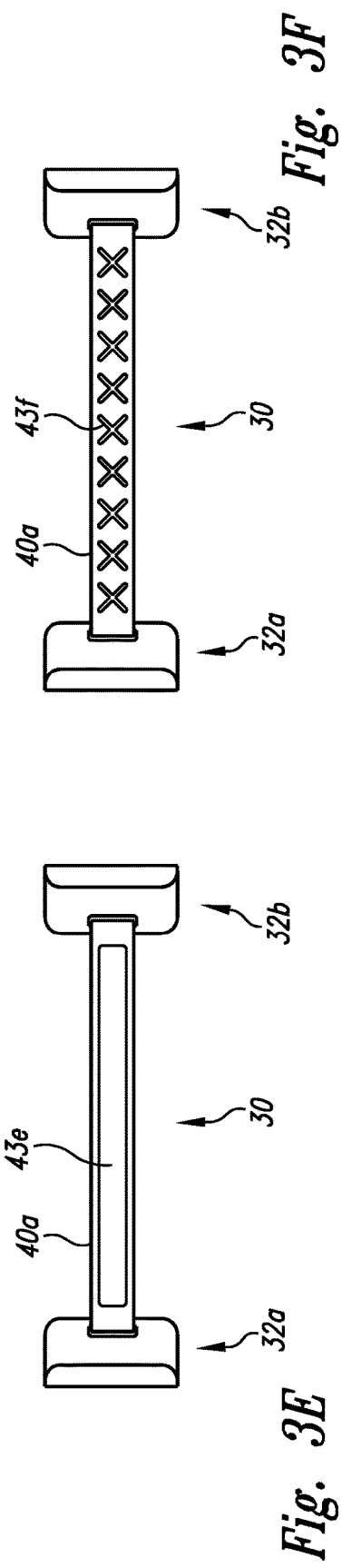
Fig. 3A  Fig. 3B
Fig. 3C  Fig. 3D
Fig. 3E  Fig. 3F

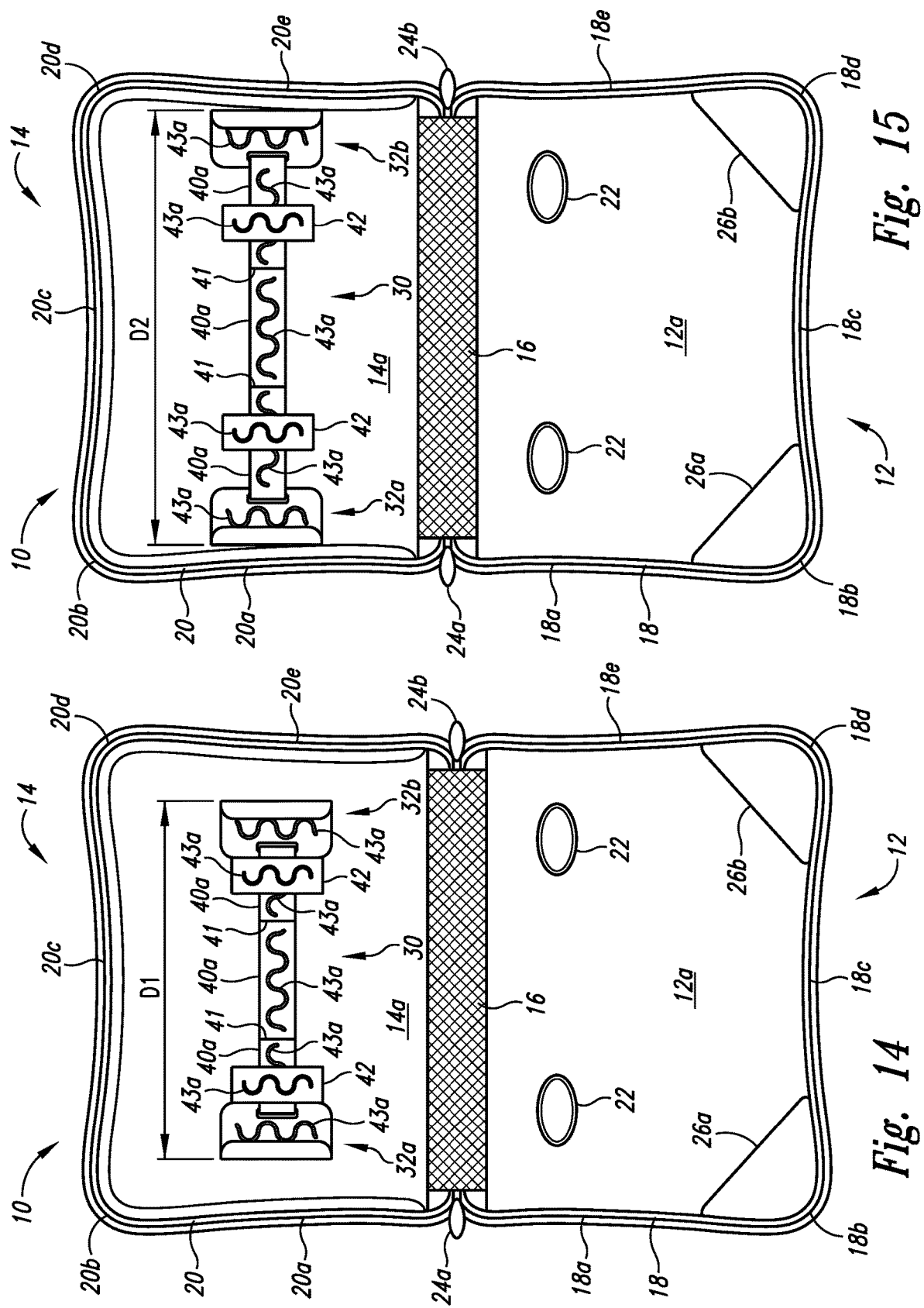

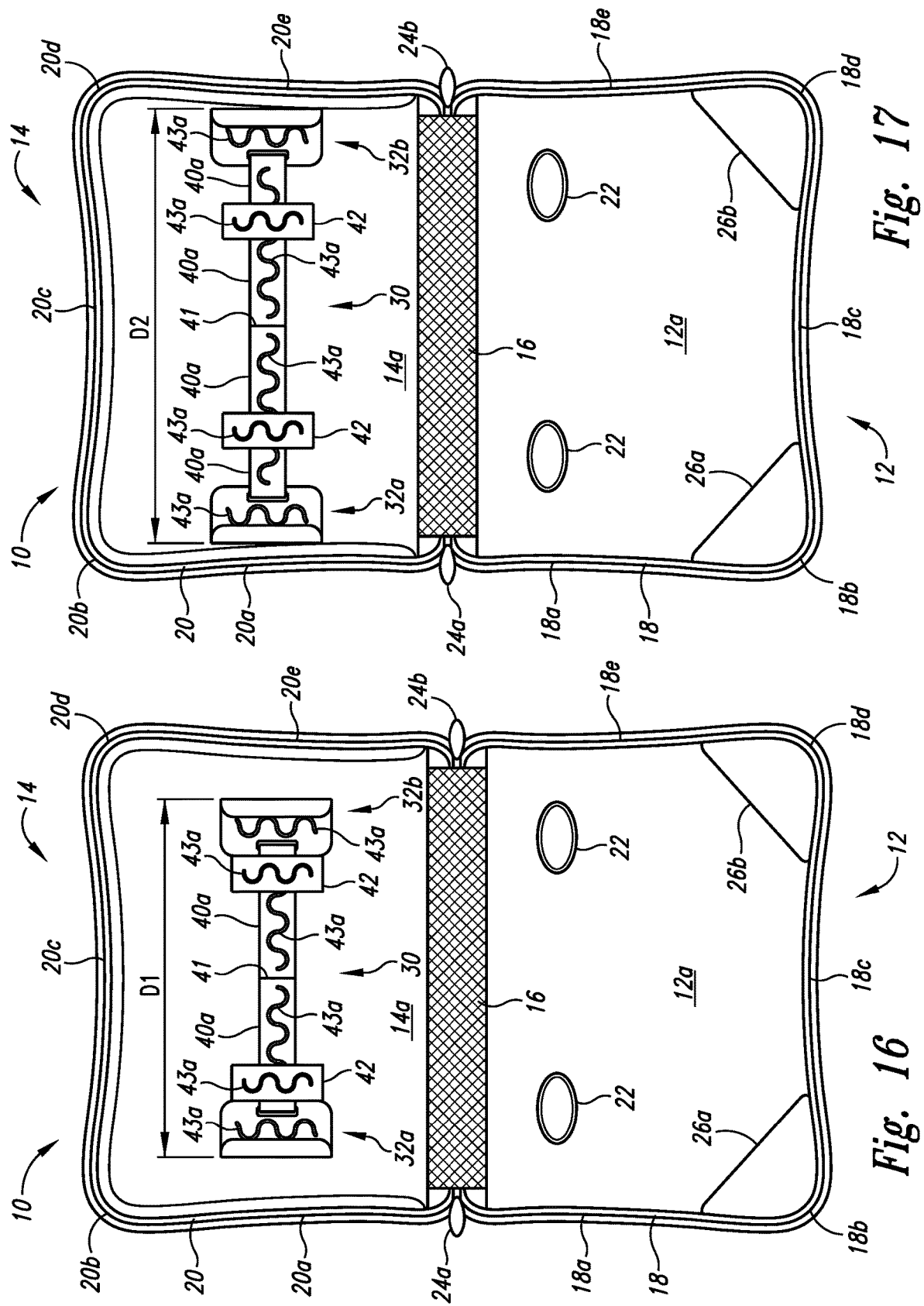

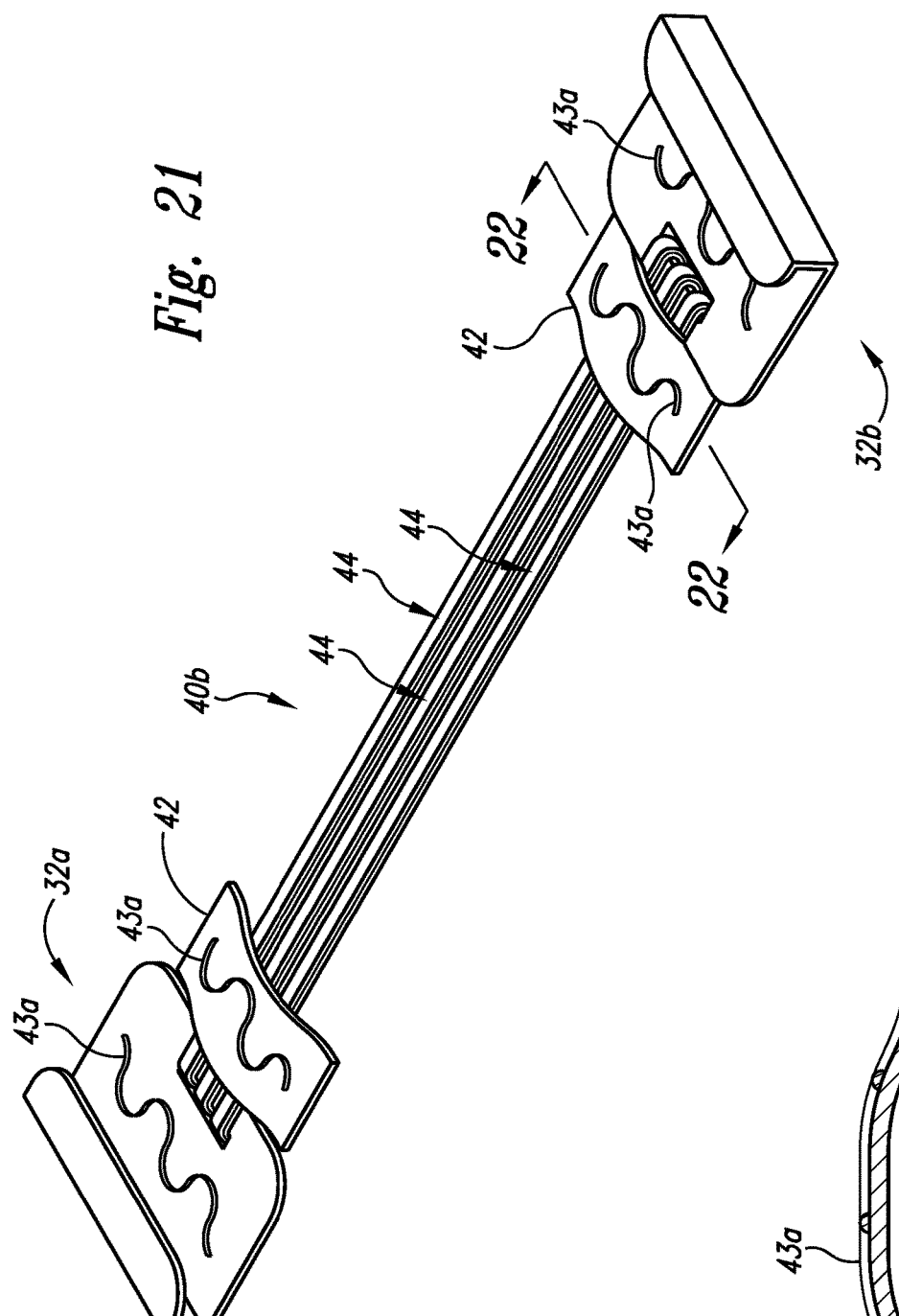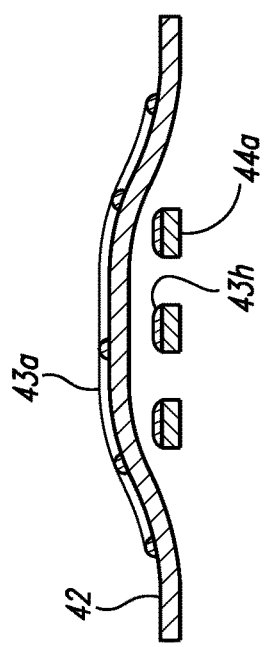

CASE FOR PORTABLE ELECTRONIC COMPUTING DEVICE

SUMMARY

In one aspect, an apparatus includes, but is not limited to a display case portion including an interior surface; a tensional retention assembly including a tensional member, a first clip, and a second clip, the tensional member including a first movable portion with a first end and a second movable portion with a second end, the first clip coupled to the first end of the first movable portion of the tensional member and the second clip coupled to the second end of the second movable portion of the tensional member, the tensional member having at least one coefficient of friction, the first clip having at least one coefficient of friction, and the second clip having at least one coefficient of friction; at least one frictional component coupled to at least a portion of the tensional retention assembly, the at least one frictional component having at least one coefficient of friction greater than the at least one coefficient of friction of the first clip, the at least one coefficient of friction of the second clip, and the at least one coefficient of friction of the tensional member; and a keyboard case portion hingedly coupled to the display case portion.

In addition to the foregoing, other aspects are described in the claims, drawings, and text forming a part of the present disclosure. Other aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of disparate material outsole-based articles of manufacture, compositions of matter, systems for producing and/or methods for producing same that may provide context, for instance, in introducing one or more processes and/or devices described herein.

FIG. 2A is an elevational cross-sectional view of the first implementation of the portable device case taken along the 2A-2A sectional arrows of FIG. 1.

FIG. 2B is an elevational cross-sectional view of a first alternative placement of the first frictional component on the first implementation of the portable device.

FIG. 2C is an elevational cross-sectional view of a second alternative placement of the first frictional component on the first implementation of the portable device.

FIG. 2D is an elevational cross-sectional view of a third alternative placement of the first frictional component on the first implementation of the portable device.

FIG. 2E is an elevational cross-sectional view of a fourth alternative placement of the first frictional component on the first implementation of the portable device.

FIG. 2F is an elevational cross-sectional view of a fifth alternative placement of the first frictional component on the first implementation of the portable device.

FIG. 3A is a top plan view of a tensional retention assembly with the first frictional component of the portable device case of FIG. 1.

FIG. 3B is a top plan view of the tensional retention assembly of FIG. 1 with a second frictional component.

FIG. 3C is a top plan view of the tensional retention assembly of FIG. 1 with a third frictional component.

FIG. 3D is a top plan view of the tensional retention assembly of FIG. 1 with a fourth frictional component.

FIG. 3E is a top plan view of the tensional retention assembly of FIG. 1 with a fifth frictional component.

FIG. 3F is a top plan view of the tensional retention assembly of FIG. 1 with a sixth frictional component.

FIG. 14 is a top plan view of first implementation of portable device case of FIG. 1 with tensional member in a contracted position.

FIG. 15 is a top plan view of first implementation of portable device case of FIG. 1 with tensional member in an expanded position.

FIG. 16 is a top plan view of fourth implementation of portable device case of FIG. 8 with tensional member in a contracted state.

FIG. 17 is a top plan view of fourth implementation of portable device case of FIG. 8 with tensional member in an extended state.

FIG. 21 is an enlarged-isolated perspective view of an alternative tensional retaining assembly with straps.

FIG. 22 is an elevational cross-sectional view of an alternative tensional retaining assembly with straps taken along the 22-22 sectional arrows of FIG. 21.

DETAILED DESCRIPTION

Figure 1:
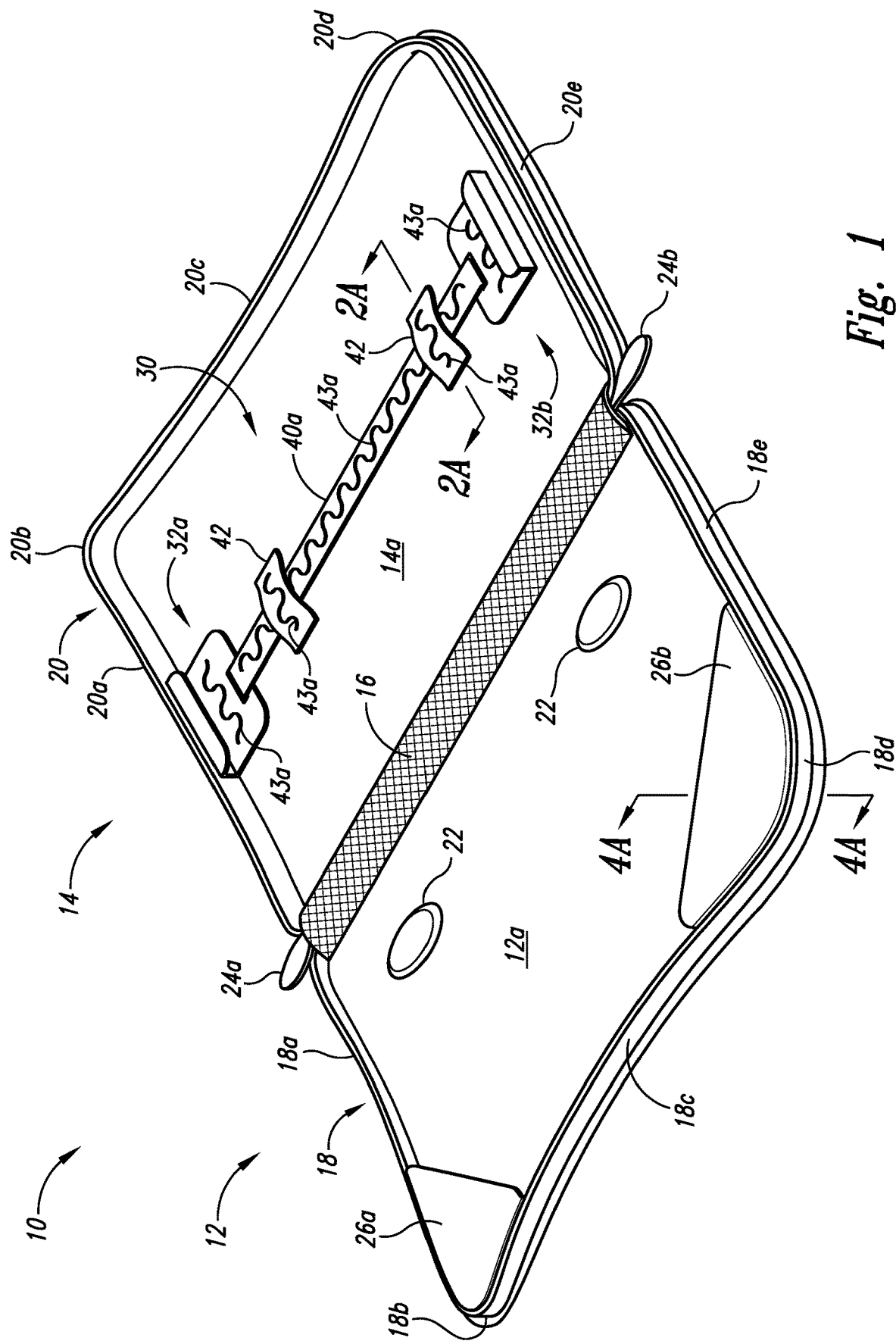
FIG. 1 is an interior perspective view of a first implementation of a portable device case in a flat-open disposition without containing an exemplary laptop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Conventional cases for portable electronic devices such as laptops can use straps and other securing means that can cause obstructions and be visually and tactilely displeasing. Conventional cases also may not stay secured to laptops when in both closed and open positions.

Referring now to FIG. 1, depicted therein is a first implementation of portable device case 10 is depicted from an interior perspective view in a flat-open disposition and as having keyboard case portion 12 having interior surface 12a and display case portion 14 having interior surface 14a with a flexible hinge-like portion 16 positioned there betwixt to allow for axially oriented motion of keyboard case portion 12 and display case portion 14 relative therebetween. As shown, interior surface 12a is bordered by hinge-like portion 16 and zippered edge 18, which includes left-side 18a, left-corner 18b, front-side 18c, right-corner 18d, and right-side 18e. Interior surface 14a is bordered by hinge-like portion 16 and zippered edge 20, which includes left-side 20a, left-corner 20b, front-side 20c, right-corner 20d, and right-side 20e. Affixed, joined, glued, stitched, as-one-piece, or otherwise extending from interior surface 12a are rests 22, which provide an amount of spacing between a received portable electronic device resting upon rests 22 and interior surface 12a. Some implementations of rests 22 may also provide a certain degree of friction-based retention of a received portable electronic device. Tabs 24a and 24b are located to assist with engaging and disengaging zipper edge 18 with zipper edge 20.

Affixed, joined, glued, stitched, as-one-piece, or otherwise extending from left-side 18a, left-corner 18b, and front-side 18c of zippered edge 18 is left-corner-holder material 26a, which is positioned above interior surface 12a to allow for a corner of a portable electronic device, such as a corner of a keyboard portion of a laptop, to be slid therebetween. Affixed, joined, glued, stitched, as-one-piece, or otherwise extending from front-side 18c, right-corner 18d, and right-side 18e of zippered edge 18 is right-corner-holder material 26b, which is positioned above interior surface 12a to allow for another corner of a portable electronic device, such as another corner of a keyboard portion of a laptop, to be slid therebetween.

Further shown in FIG. 1, tensional retention assembly 30 includes left channeled clip 32a and right channeled clip 32b coupled on either end of tensional member 40a depicted as an elastic band or other springy material such as elastic cords. Left channeled clip 32a and right channeled clip 32b can be made from polypropylene, other hard, bendable plastic, or other such material. The first implementation of portable device case 10 includes straps 42, which can be affixed, joined, glued, stitched, or otherwise extend from interior surface 14a, to movably couple to interior surface 14a the two movable portions of tensional member 40a by allowing the two movable portions of tensional member 40a to slide between each strap 42 and interior surface 14a. Straps 42 can be made from inflexible material, such as webbing, and can be sewn into case wall underneath interior surface 14a to limit movement of the two loose ends of tensional member 40a within portable electronic case 10. Further shown to be included is first frictional component 43a permanently adhered to such surfaces as left channel clip 32a, right channel clip 32b, tensional member 40a, and straps 42. In other implementations not all these surfaces may have first frictional component 43a adhered thereto or other surfaces of portable electronic case 10 may have first frictional component 43a adhered thereto. First frictional component 43a has a coefficient of friction greater than such surfaces as those of left-corner-holder material 26a, right-corner-holder material 26b, left channel clip 32a, right channel clip 32b, tensional member 40a, and straps 42. First frictional component 43a can be made from a silicone or other material that generally has a slightly tacky, gummy, sticky texture such as having a relatively high coefficient of friction of 1.0 or having a relatively high coefficient of friction between a range of 0.9 to 1.1 where the coefficient of friction is defined by $u=f/N$, where u is the coefficient of friction, f is the resultant frictional force, and N is the normal force. Consequently, including first frictional component 43a in one or more positions as shown or for instance as discussed below, on interior surfaces of straps 42, will all impart resistance to sliding of portions of a laptop, such as its screen, being contained so will maintain a more stable laptop positioning. Further, some placements of first frictional component 43a such as shown being on portions of tensional member 40a can help to impart resistance to reduce side-to-side sliding between tensional member 40a and straps 42 to further stabilize laptop positioning. Further, as discussed below first frictional component 43a can be positioned on interior surfaces of right-corner-holder material 26a and right-corner-holder material 26b or other shaped corner-holders to help stabilize a laptop keyboard portion being contained.

Referring now to FIG. 2A, depicted therein is an elevational cross-sectional view of the first implementation of the portable device case taken along the 2A-2A sectional arrows of FIG. 1 depicting first frictional component 43a on an exterior surface of strap 42 and also depicting first frictional component 43a on a surface of tensional member 40a facing an interior surface of strap 42.

Referring now to FIG. 2B, depicted therein is an elevational cross-sectional view of a first alternative placement of the first frictional component 43a on the first implementation of the portable device depicting first frictional component 43a on an exterior surface of strap 42.

Referring now to FIG. 2C, depicted therein is an elevational cross-sectional view of a second alternative placement of the first frictional component 43a on the first implementation of the portable device depicting first frictional component 43a on an interior surface of strap 42 facing tensional member 40a.

Referring now to FIG. 2D, depicted therein is an elevational cross-sectional view of a third alternative placement of the first frictional component 43a on the first implementation of the portable device depicting first frictional component 43a on an interior surface 14a of display case portion 14 facing tensional member 40a.

Referring now to FIG. 2E, depicted therein is an elevational cross-sectional view of a fourth alternative placement of the first frictional component 43a on the first implementation of the portable device depicting first frictional component 43a on an interior surface 14a of display case portion 14 and first frictional component 43a an interior surface of tensional member 40a so positioned to face one another.

Referring now to FIG. 2F, depicted therein is an elevational cross-sectional view of a fifth alternative placement of the first frictional component 43a on the first implementation of the portable device depicting first frictional component 43a on tensional member 40a facing strap 42.

Referring now to FIG. 3A, depicted therein is a top plan view of a clip assembly with the first frictional component 43a of the portable device case of FIG. 1 depicted with a sinuous curvilinear frictional material pattern. This sinuous frictional material pattern of the first frictional component 43a can also be positioned on other portions of portable device case 10 such as left channel clip 32a, right channel clip 32b, and straps 42. Although only one row of first frictional component 43a is shown, alternative implementations can include multiple rows.

Referring now to FIG. 3B, depicted therein is a top plan view of a clip assembly of FIG. 1 with a second frictional component 43b depicted with an angled-slash pattern of frictional material segments positioned on angle with respect to the tensional member 40a longitudinal dimension. This angled-slash pattern of the second frictional component 43b can also be positioned on other portions of portable device case 10 such as left channel clip 32a, right channel clip 32b, and straps 42. Although only one row of second frictional component 43b is shown, alternative implementations can include multiple rows.

Referring now to FIG. 3C, depicted therein is a top plan view of a clip assembly of FIG. 1 with a third frictional component 43c depicted with a longitudinal pattern of frictional material segments positioned as extending longitudinally along the tensional member 40a longitudinal dimension. This longitudinal pattern of the third frictional component 43c can also be positioned on other portions of portable device case 10 such as left channel clip 32a, right channel clip 32b, and straps 42. Although three rows of third frictional component 43c is shown, alternative implementations can include other numbers of rows.

Referring now to FIG. 3D, depicted therein is a top plan view of a clip assembly of FIG. 1 with a fourth frictional component 43d depicted with a perpendicular pattern of frictional material segments positioned as extending perpendicularly along the tensional member 40a longitudinal dimension. This perpendicular pattern of the fourth frictional component 43d can also be positioned on other portions of portable device case 10 such as left channel clip 32a, right channel clip 32b, and straps 42. Although only one row of fourth frictional component 43d is shown, alternative implementations can include multiple rows.

Referring now to FIG. 3E, depicted therein is a top plan view of a clip assembly of FIG. 1 with a fifth frictional component 43e depicted with a rectangular pattern of a frictional material segment positioned as extending rectangularly along the tensional member 40a longitudinal dimension. This rectangular pattern of the fifth frictional component 43e can also be positioned on other portions of portable device case 10 such as left channel clip 32a, right channel clip 32b, and straps 42. Although only one row of fifth frictional component 43e is shown, alternative implementations can include multiple rows.

Referring now to FIG. 3F, depicted therein is a top plan view of a clip assembly of FIG. 1 with a sixth frictional component 43f depicted with a repeating-cross pattern of frictional material segments positioned as extending along the tensional member 40a longitudinal dimension. This repeating-cross pattern of the sixth frictional component 43f can also be positioned on other portions of portable device case 10 such as left channel clip 32a, right channel clip 32b, and straps 42. Although only one row of sixth frictional component 43f is shown, alternative implementations can include multiple rows.

Figure 3G:
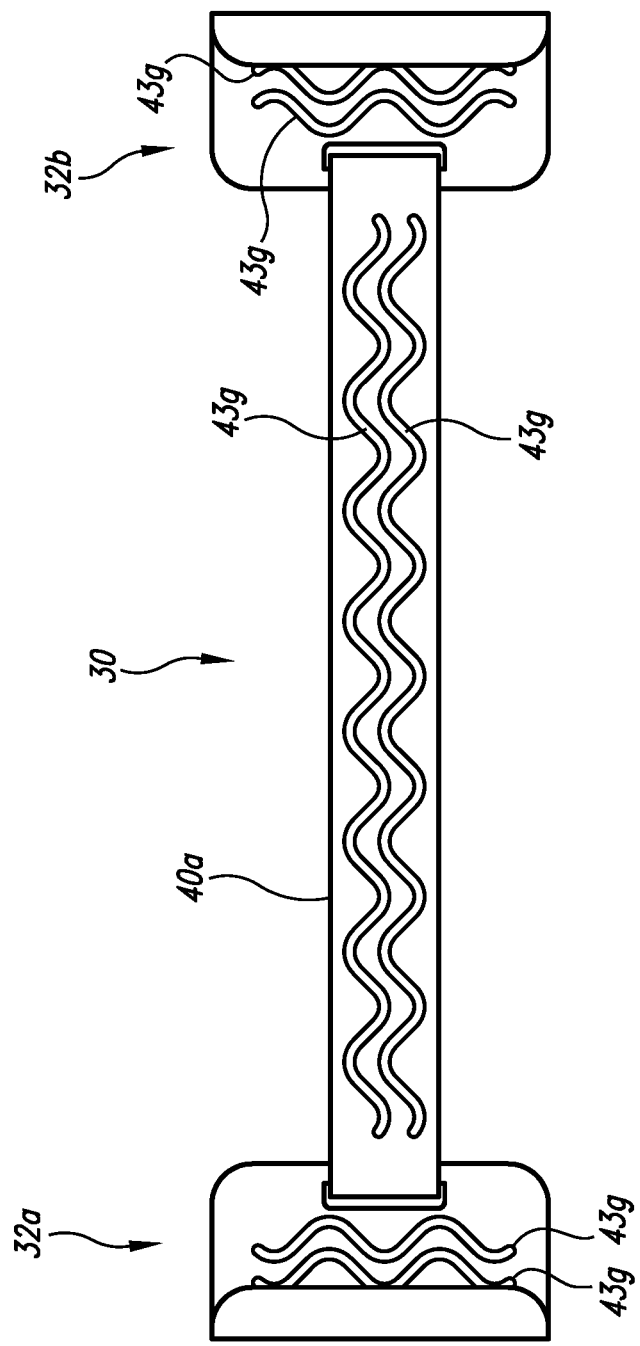
FIG. 3G is a top plan view of the tensional retention assembly of FIG. 1 with a seventh frictional component.

Referring now to FIG. 3G, depicted therein is a top plan view of a clip assembly of FIG. 1 with a seventh frictional component 43g depicted with a double row sinuous curvilinear frictional material pattern of frictional material segments positioned as extending along the tensional member 40a longitudinal dimension. This double row sinuous curvilinear frictional material pattern of the seventh frictional component 43g can also be positioned on other portions of portable device case 10 such as left channel clip 32a, right channel clip 32b, and straps 42. Although two rows of seventh frictional component 43g is shown, alternative implementations can include other numbers of rows. Also, other types of curvilinear and/or linear patterns can be used for frictional components.

Figure 4A:
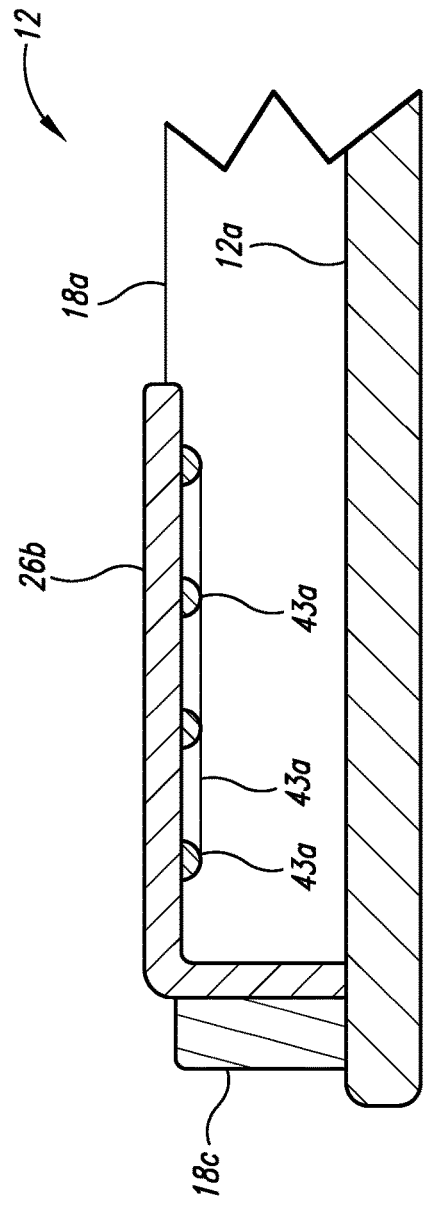
FIG. 4A is an elevational cross-sectional view of a first version of the first implementation of the portable device case taken along the 4A-4A sectional arrows of FIG. 1.

Referring now to FIG. 4A, depicted therein is an elevational cross-sectional view of a first version of the first implementation of the portable device case taken along the 4A-4A sectional arrows of FIG. 1 depicted with the first frictional component 43a positioned on an interior surface of right-corner-holder material 26b.

Figure 4B:
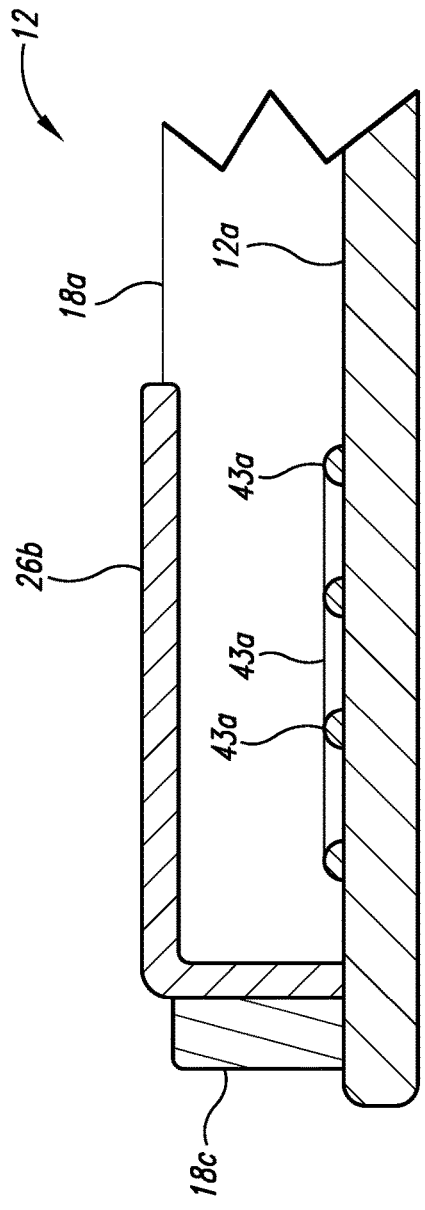
FIG. 4B is an elevational cross-sectional view of a second version of the first implementation of the portable device case taken along the 4A-4A sectional arrows of FIG. 1.

Referring now to FIG. 4B, depicted therein is an elevational cross-sectional view of a second version of the first implementation of the portable device case taken along the 4A-4A sectional arrows of FIG. 1 depicted with the first frictional component 43a positioned on interior surface 12a of keyboard case portion 12.

Figure 5:
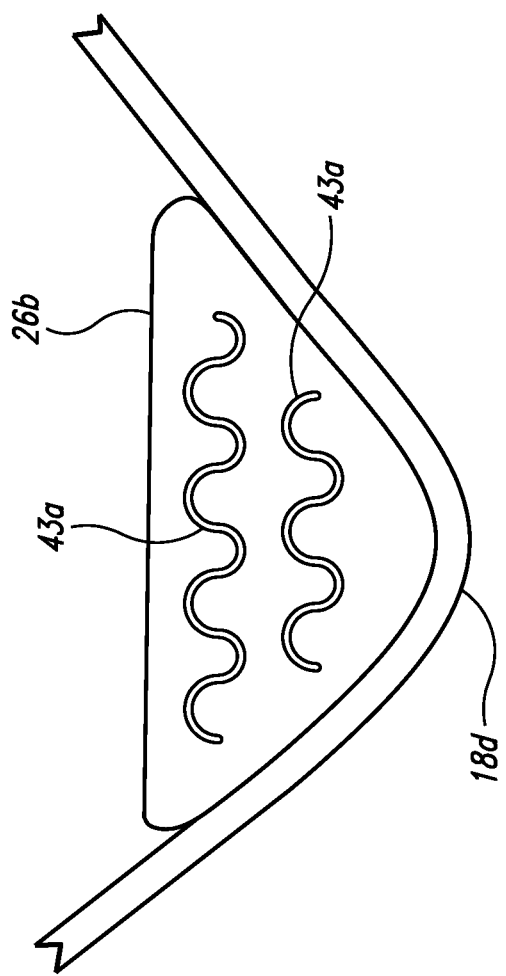
FIG. 5 is a top plan view of a corner section of an alternative version of the portable device case with the first frictional component of FIG. 3A also positioned on an exterior surface of corner-holder material.

Referring now to FIG. 5, depicted therein is a top plan view of a corner section of an alternative version of the portable device case with the first frictional component 43a also positioned on right-corner-holder material 26b.

Figure 6:
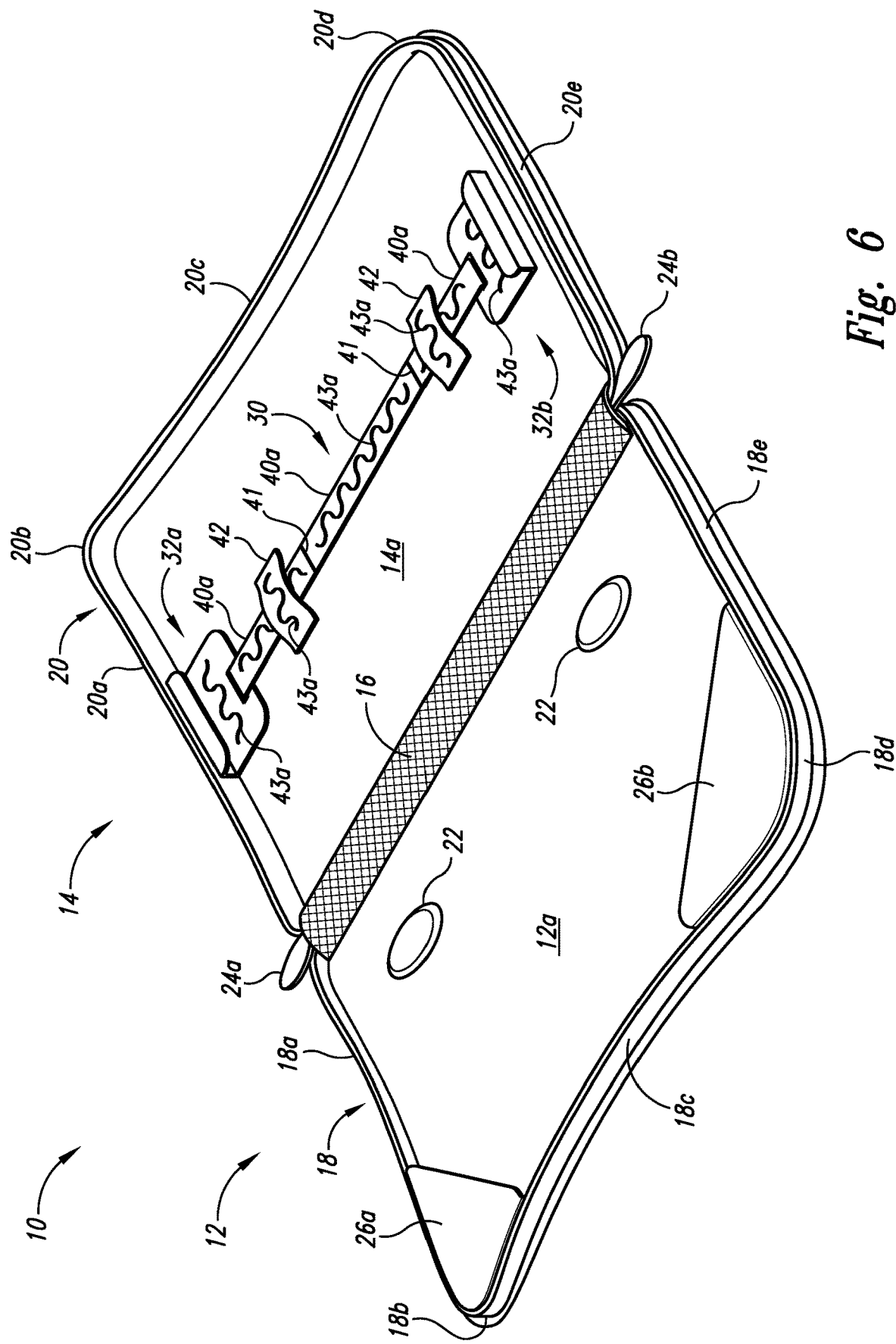
FIG. 6 is an interior perspective view of a second implementation of a portable device case in a flat-open disposition without containing an exemplary laptop.

Referring now to FIG. 6, depicted therein is an interior perspective view of a second implementation of portable device case 10 in a flat-open disposition without containing an exemplary laptop. The second implementation of portable device case 10 includes tensional member 40a, which in this implementation has two portions that receive two instances of coupler 41 to fixedly coupled the two portions to interior surface 14a by the two instances of coupler 41, which can include stitches, staples, adhesive, welds, rivets, tacks, co-molding, or other such linking means. Tensional member 40a is shown having a mid-portion that is fixed in place with both ends of the mid-portion being the two portions of tensional member 40a that each receive one of the two instances of coupler 41 to be fixedly coupled to interior surface 14a with an instance each of coupler 41 on either end of the mid-portion. As such, the two movable portions of tensional member 40a that movably extend from each of the two instances of coupler 41 are capable of stretching, when applied forces are put on both of its ends in opposite directions away from its center, from a contracted length to an extended length longer than the contracted length. When in its extended length, the tensional member 40a consequently provides tensional forces that oppose those applied forces that caused it to stretch from a contracted length to an extended length. These tensional forces help to secure left channeled clip 32a and right channeled clip 32b in engaging with a display portion of a portable electronic device.

Figure 7:
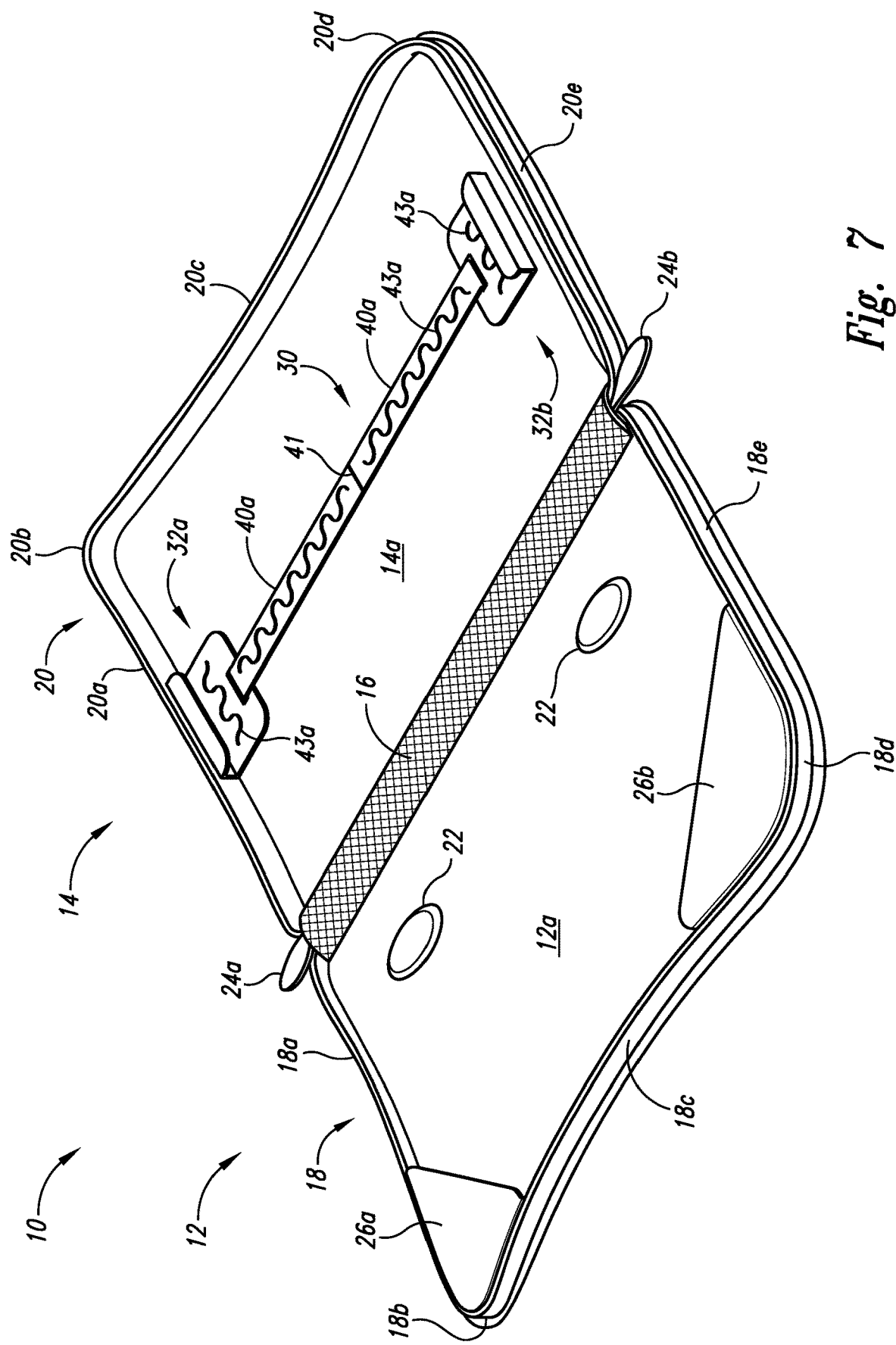
FIG. 7 is an interior perspective view of a third implementation of a portable device case in a flat-open disposition without containing an exemplary laptop.

Referring now to FIG. 7, depicted therein is an interior perspective view of a third implementation of portable device case 10 in a flat-open disposition without containing an exemplary laptop and shown to be similar to the first implementation except the third implementation is shown to have a single coupler 41.

Figure 8:
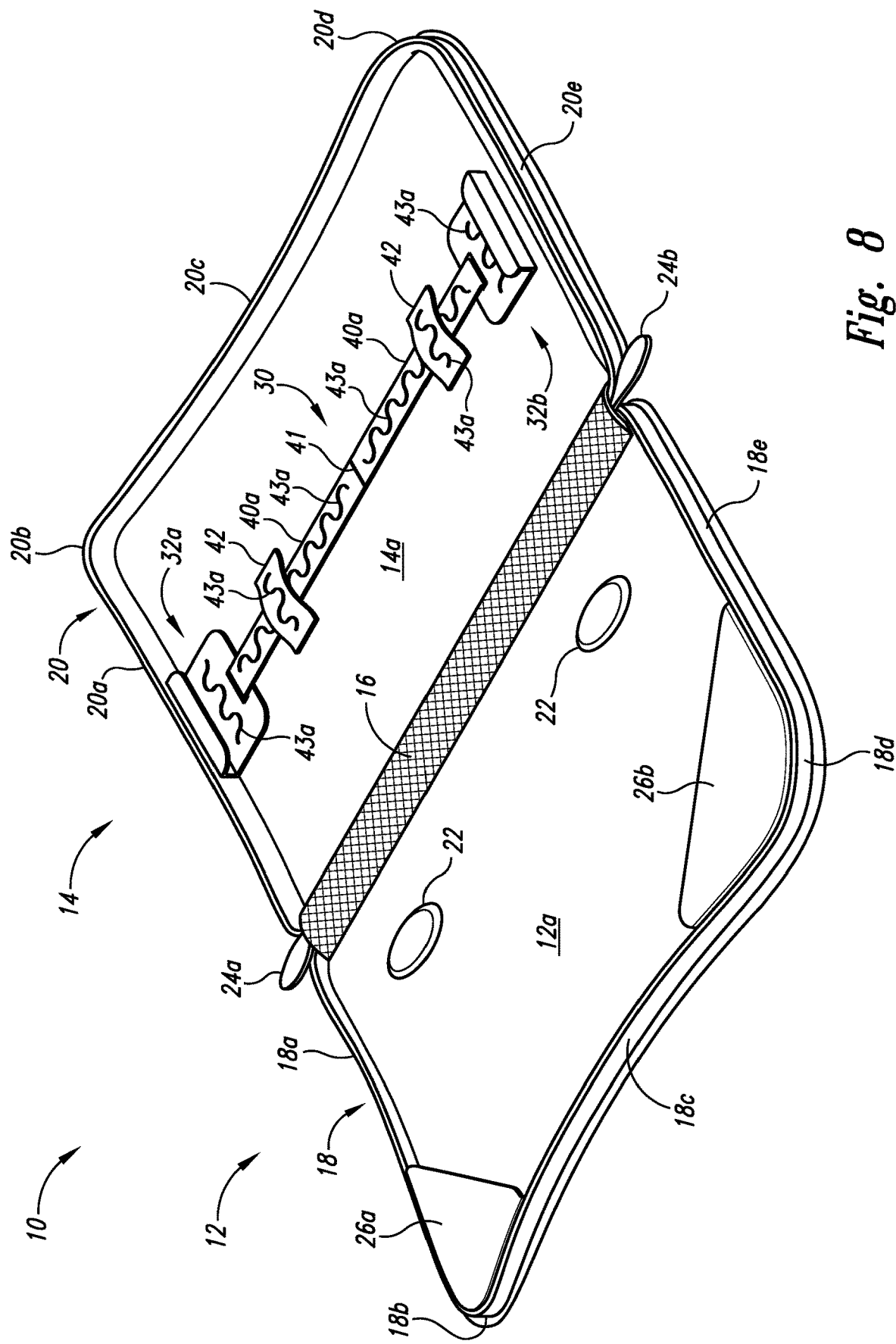
FIG. 8 is an interior perspective view of a fourth implementation of a portable device case in a flat-open disposition without containing an exemplary laptop.

Referring now to FIG. 8, depicted therein is an interior perspective view of a fourth implementation of portable device case 10 in a flat-open disposition without containing an exemplary laptop and shown to be similar to the second implementation except the fourth implementation is shown to have a single coupler 41.

Figure 9:
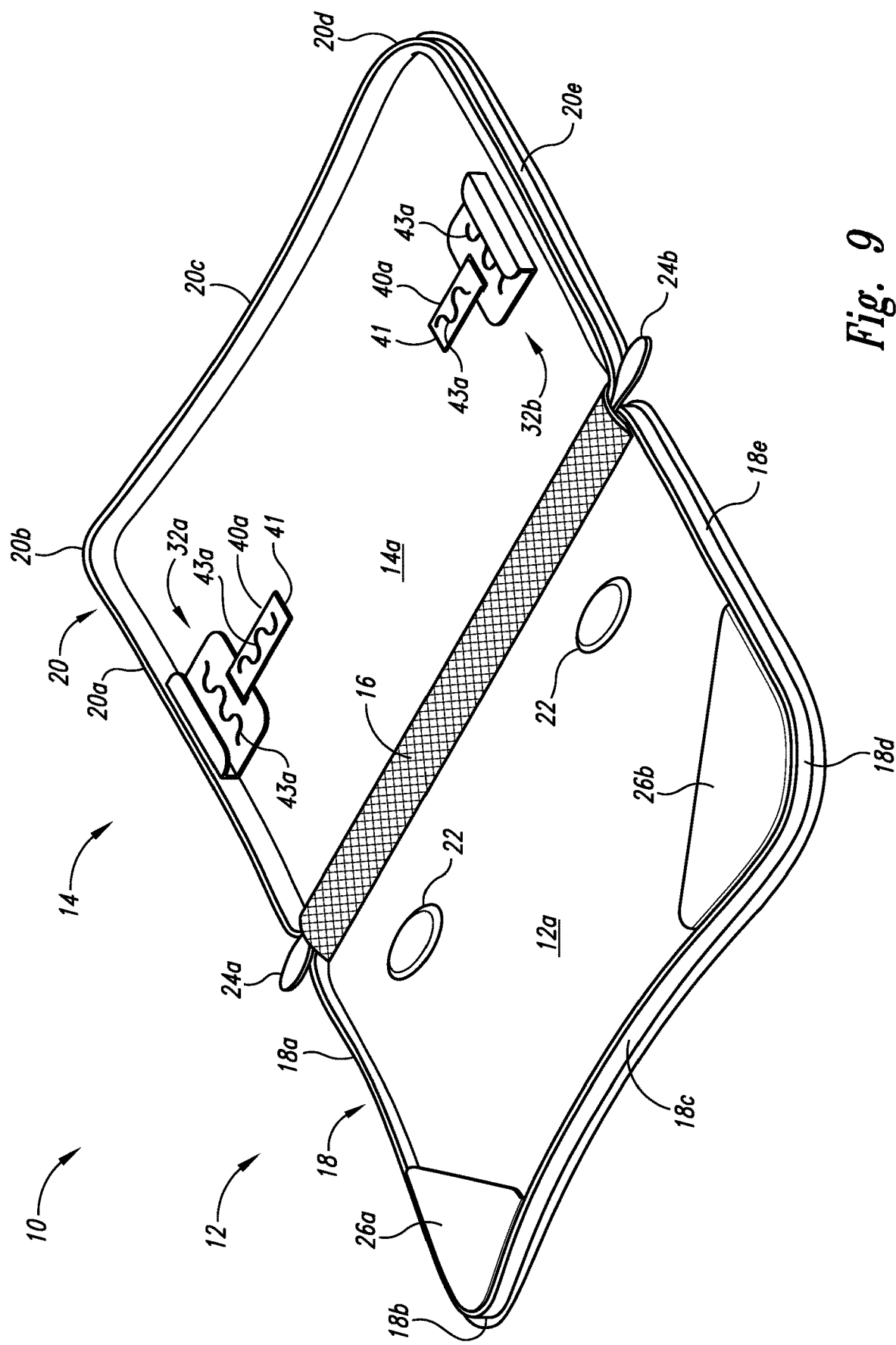
FIG. 9 is an interior perspective view of a fifth implementation of a portable device case in a flat-open disposition without containing an exemplary laptop.

Referring now to FIG. 9, depicted therein is an interior perspective view of a fifth implementation of portable device case 10 in a flat-open disposition without containing an exemplary laptop and shown to be similar to the first implementation except the fifth implementation is shown to have two movable portions of tensional member 40a that extend past their respective couplers 41 without tensional member 40a having a mid-portion between the two couplers 41 shown.

Figure 10:
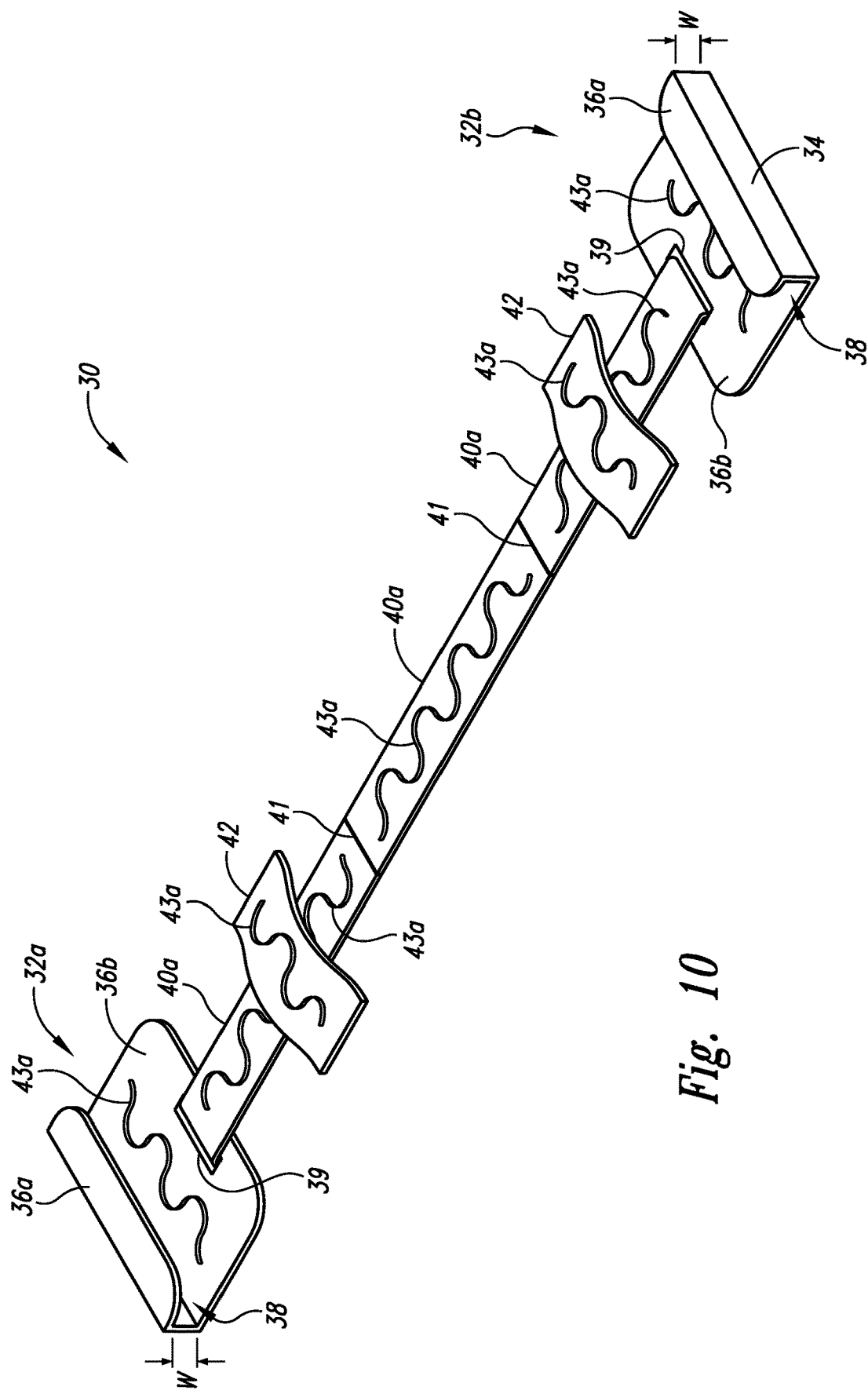
FIG. 10 is an enlarged-isolated perspective view of the tensional retaining assembly of second implementation of the portable device case of FIG. 6.

As further shown in FIG. 10, left channeled clip 32a and right channeled clip 32b are depicted as each having spine 34 of width "W" with first-side wall 36a and second-side wall 36b extending therefrom thereby forming slot 38 sized to receive an edge portion of a portable electronic device display. First-side wall 36a extends from spine 34 an extent dependent upon bevel width of the portable electronic device display involved. Second-side wall 36b generally extends farther from spine 34 since second-side wall 36b is positioned adjacent a back-non-display surface of the portable electronic device display involved and also to allow for ample material to provide slot-holes 39 for tensional member 40a to be coupled therewith.

Figure 11:
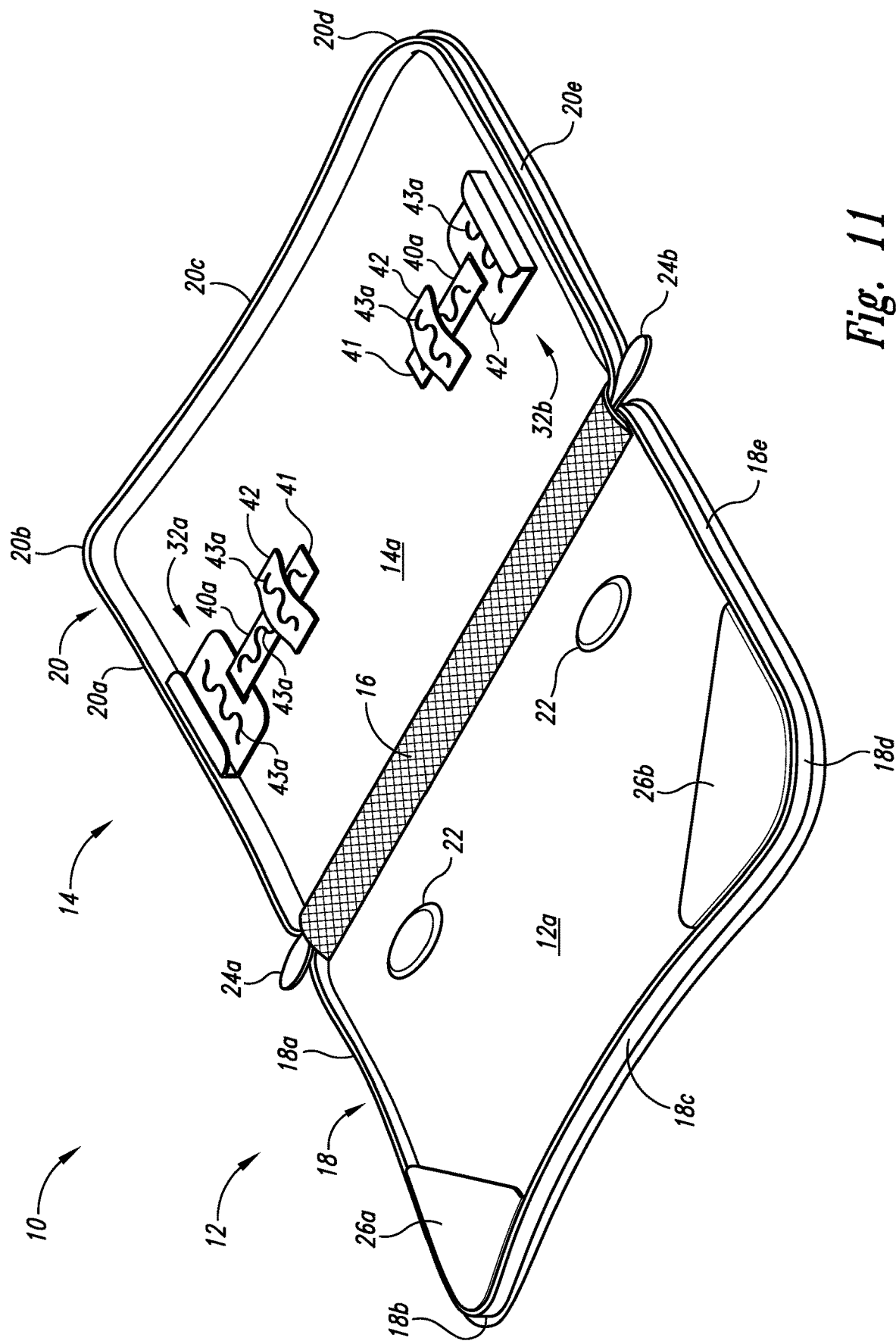
FIG. 11 is an interior perspective view of a sixth implementation of a portable device case in a flat-open disposition without containing an exemplary laptop.

Referring now to FIG. 11, depicted therein is an interior perspective view of a sixth implementation of portable device case 10 in a flat-open disposition without containing an exemplary laptop and shown to have two couplers 41 and two straps 42 similar to the second implementation without a mid-portion of tensional member 40a similar to the fifth implementation.

Figure 12:
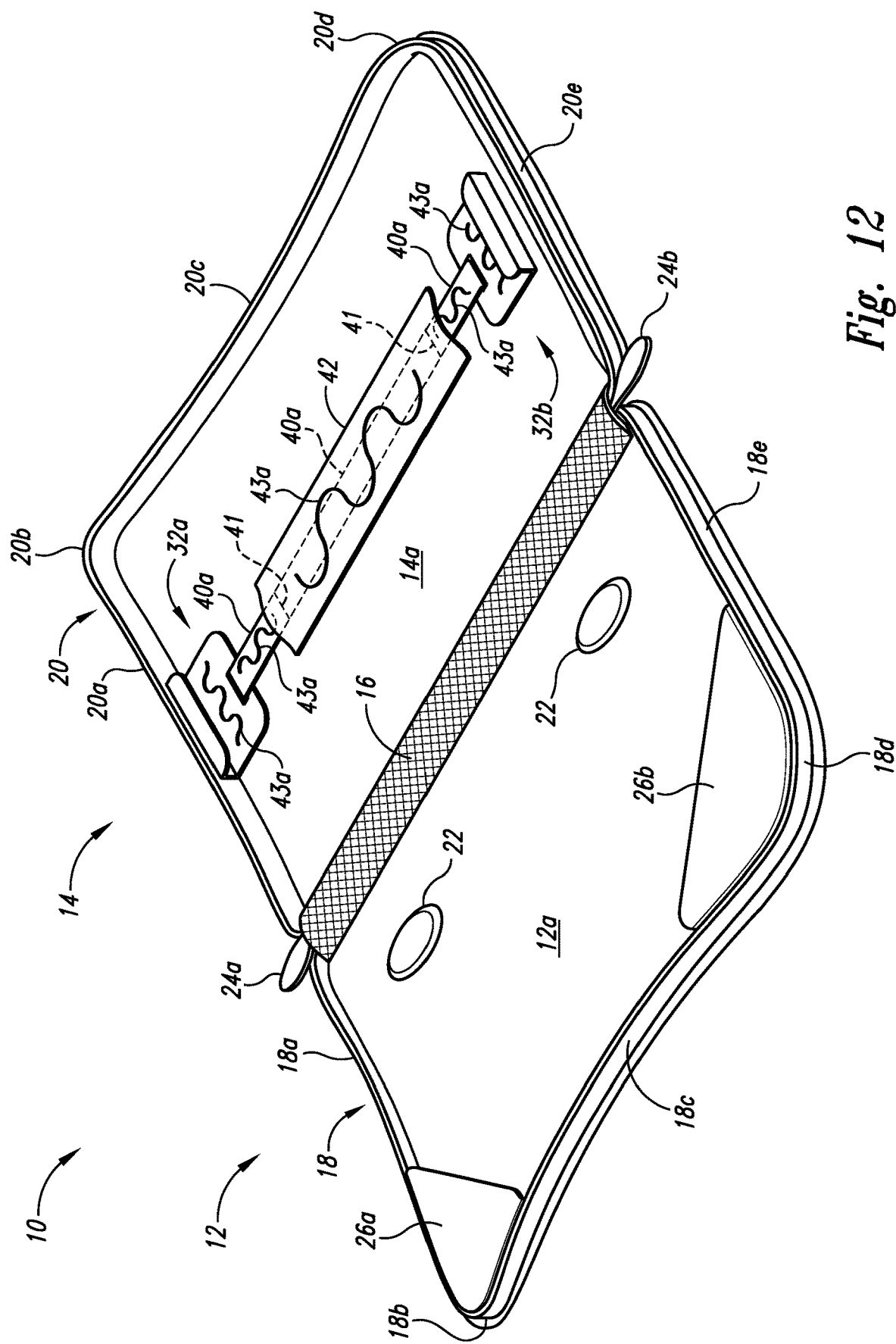
FIG. 12 is an interior perspective view of a seventh implementation of a portable device case in a flat-open disposition without containing an exemplary laptop.

Referring now to FIG. 12, depicted therein is an interior perspective view of a seventh implementation of portable device case 10 in a flat-open disposition without containing an exemplary laptop and shown to be similar to the first implementation except the seventh implementation is shown to have a single large strap 42 extending over both of the two couplers 41 and extending oven the entire mid-portion of tensional member 40a. As shown, the first frictional component 43a extends along the single large strap 42.

Figure 13:
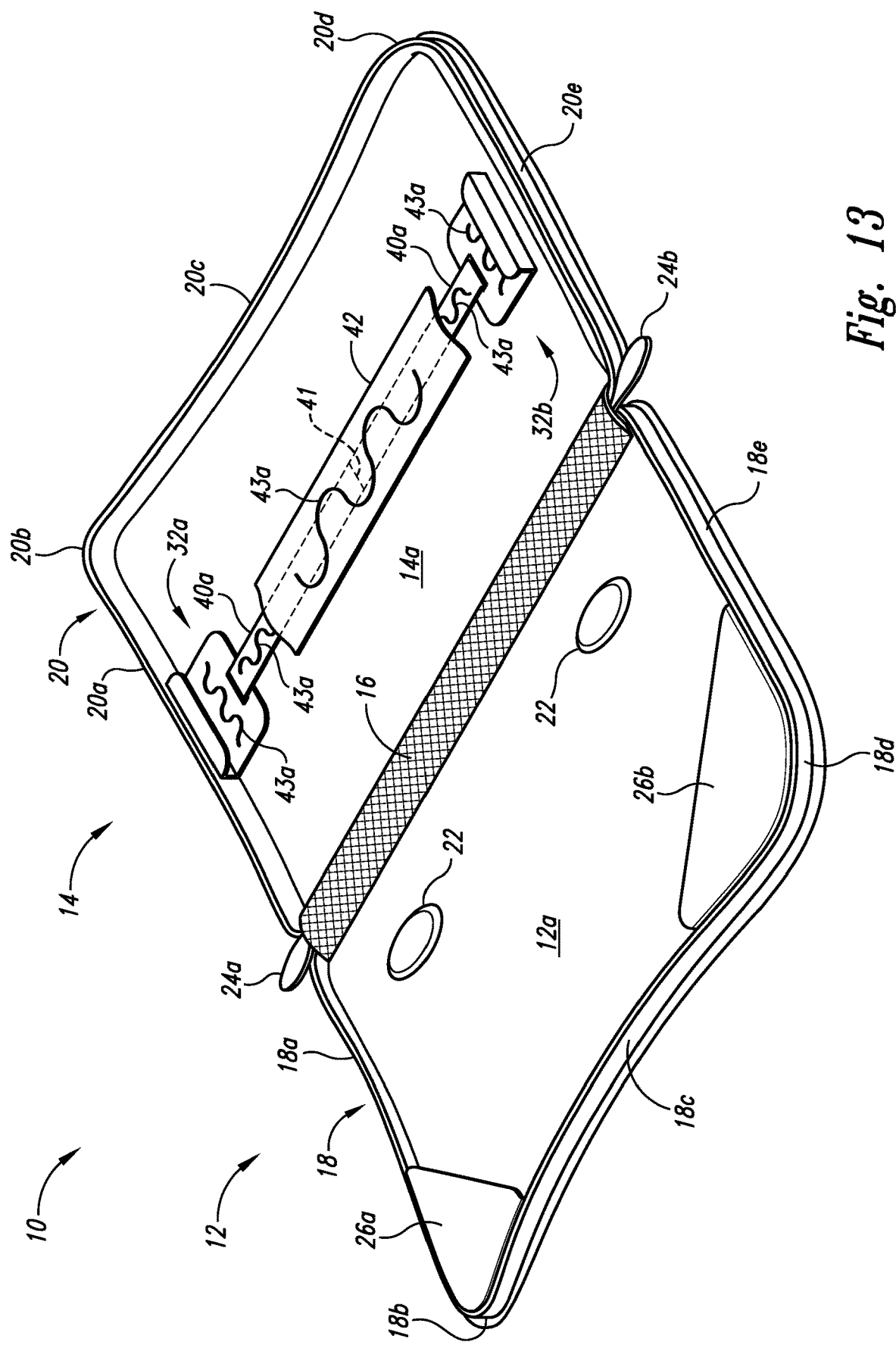
FIG. 13 is an interior perspective view of an eighth implementation of a portable device case in a flat-open disposition without containing an exemplary laptop.

Referring now to FIG. 13, depicted therein is an interior perspective view of an eighth implementation of portable device case 10 in a flat-open disposition without containing an exemplary laptop and shown to be similar to the third implementation except the eighth implementation is shown to have a single large strap 42 extending over a majority of tensional member 40a.

Referring now to FIG. 14, depicted therein is a top plan view of first implementation of portable device case 10 of FIG. 1 with tensional member 40a in a contracted state with a contracted length, D1, between left channeled clip 32a and right channeled clip 32b. This contracted state could typically exist when a portable electronic device is not being contained by portable device case 10.

Referring now to FIG. 15, depicted therein is a top plan view of first implementation of portable device case 10 of FIG. 1 with tensional member 40a in an expanded state with an extended length, D2, between left channeled clip 32a and right channeled clip 32b. This extended position could typically exist when there is a portable electronic device being contained by portable device case 10.

Referring now to FIG. 16, depicted therein is a top plan view of fourth implementation of portable device case 10 of FIG. 8 with tensional member 40a in a contracted state with a contracted length, D1, between left channeled clip 32a and right channeled clip 32b. This contracted state could typically exist when a portable electronic device is not being contained by portable device case 10.

Referring now to FIG. 17, depicted therein is a top plan view of fourth implementation of portable device case of FIG. 8 with tensional member 40a in an extended state with an extended length, D2, between left channeled clip 32a and right channeled clip 32b. This extended position could typically exist when there is a portable electronic device being contained by portable device case 10.

Figure 18:
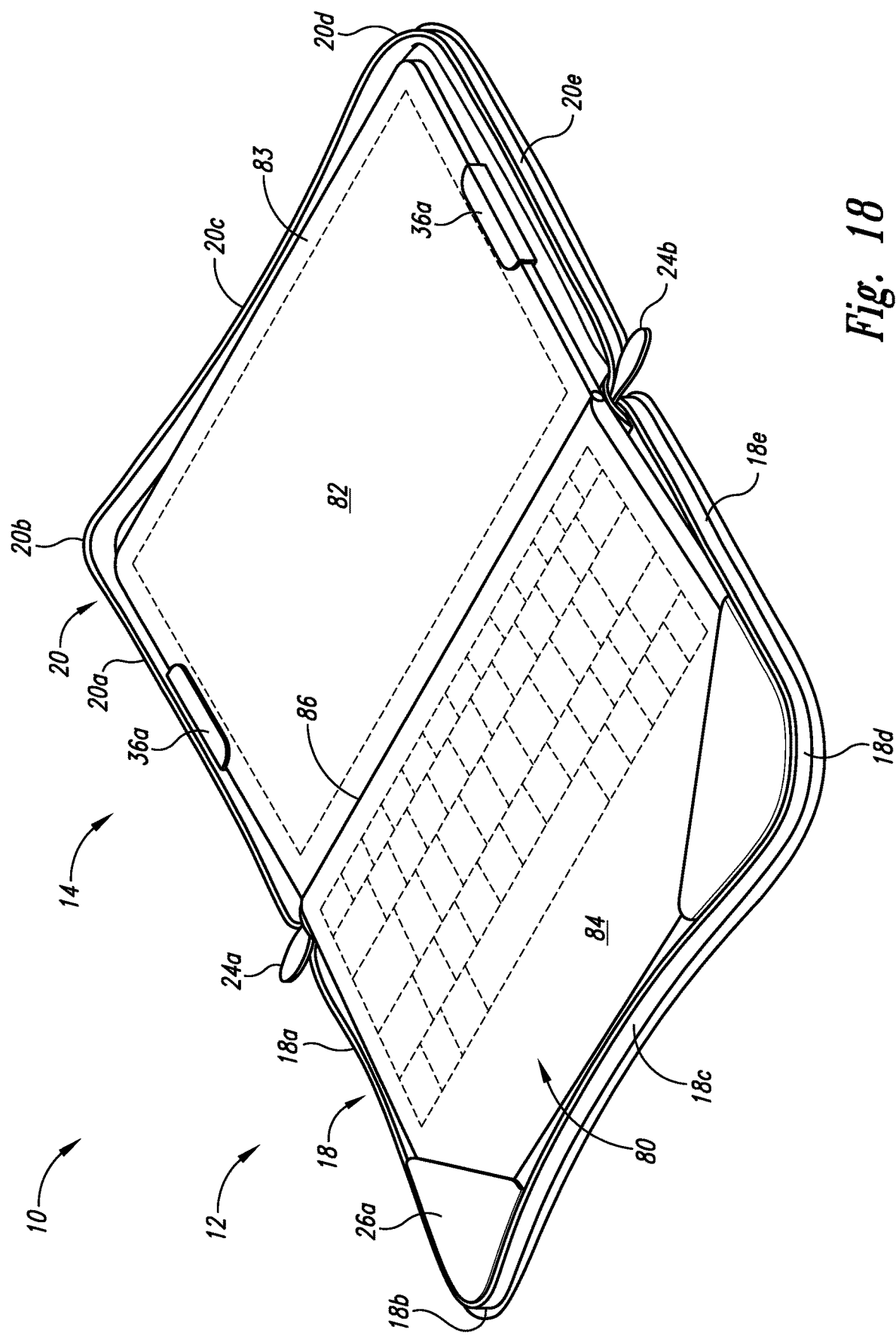
FIG. 18 is an interior perspective view of portable device case in flat-open disposition shown containing an exemplary laptop.
Figure 19:
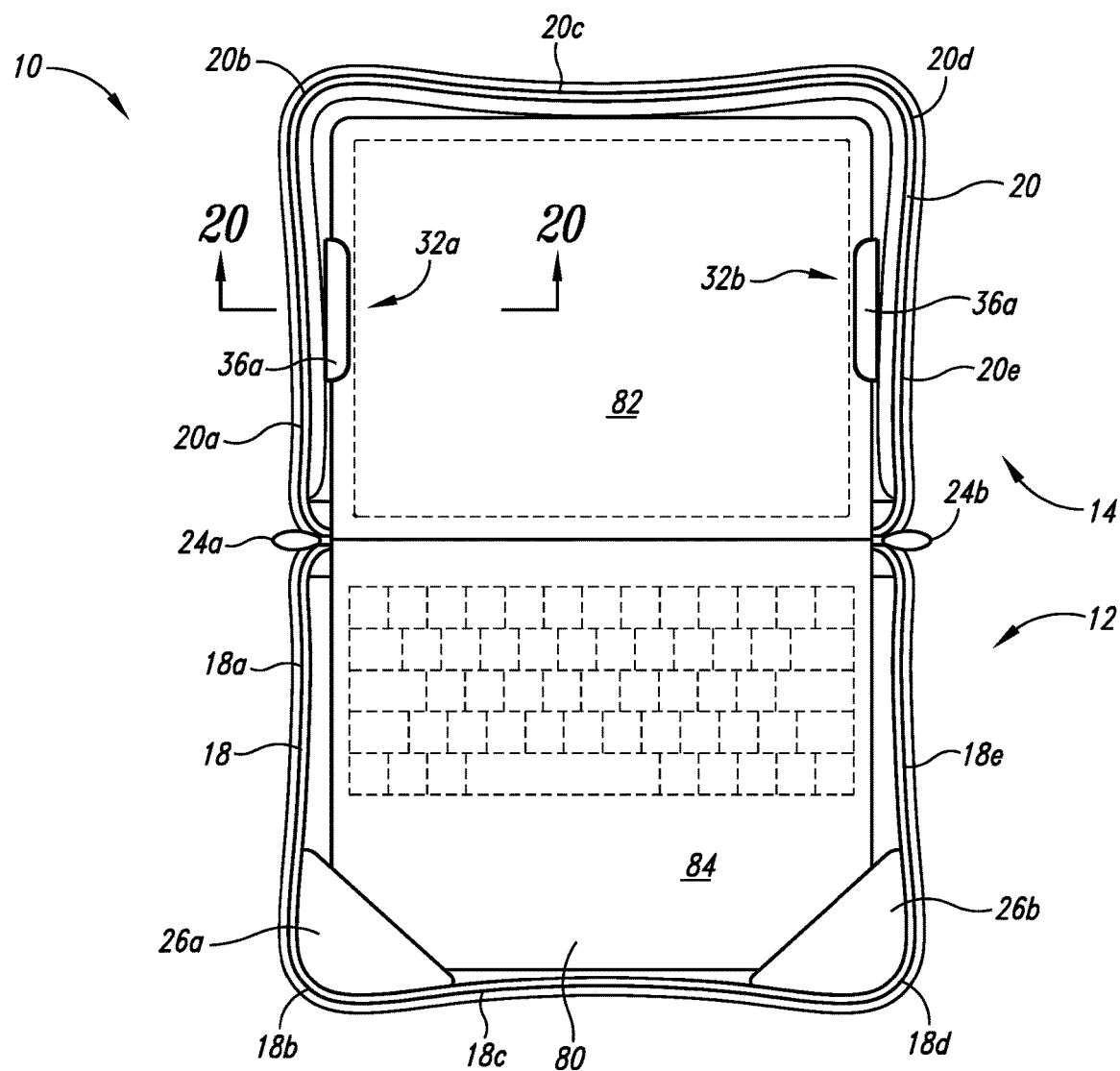
FIG. 19 is top plan view of portable device case in the flat-open disposition shown containing an exemplary laptop.

Turning now to FIGS. 18 and 19, second implementation of portable device case 10 is shown containing an exemplary portable electronic device depicted as exemplary laptop 80 with its display portion 82 held by tensional retention assembly 30 of case 10, its keyboard portion 84 being held between left-corner-holder material 26a and interior surface 12a of case 10, and between right-corner-holder material 26b and interior surface 12a of case 10, and its hinged portion 86 resting upon hinge-like portion 16 of case 10. Also shown, first-side walls 36a of left channeled clip 32a and right channeled clip 32b are sized so as not to extend past bezel 83 of display portion 82 of exemplary laptop 80 so as not to block any part of images being displayed by display portion 82. When used together under tensional forces of tensional member 40a, as tensional means, when stretched from its contracted length, D1 to its extended length, D2, left channeled clip 32a and right channeled clip 32b can, as engaging means, firmly grab, to couple with, display portion 82 of exemplary laptop 80 (or other rectangularly shaped portion of similar thickness of a portable electronic device) to secure such display portion 82 within the interior of portable device case 10. Through use of its tensional member 40a, tensional retention assembly 30 can allow for various widths of portable electronic devices to be retained therewith. Furthermore, left channeled clip 32a, right channeled clip 32b, and tensional member 40a can allow for ready replacement or removable from portable device case 10 if desired.

Figure 20:
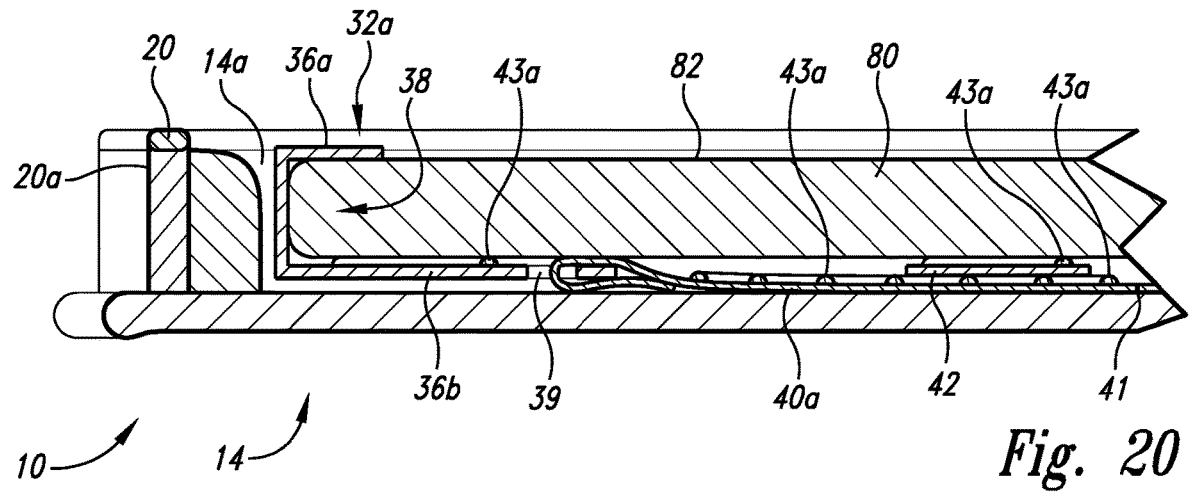
FIG. 20 is an elevational cross-sectional view taken along the 19-19 sectional arrows of FIG. 19 of second implementation of portable device case of FIG. 6 shown containing an exemplary laptop.

Referring to FIG. 20, depicted therein is an elevational cross-sectional view taken along the 19-19 sectional arrows of FIG. 19 of second implementation of portable device case of FIG. 6 shown containing an exemplary laptop. Display portion 82 of exemplary laptop 80 further shown being retained by tensional retention assembly 30 with channel-left clip 32a shown engaging with display portion 82 and tensional member 40a positioned between interior surface 12a and strap 42. Also shown is positioning of first frictional component 43a.

Referring to FIG. 21, depicted therein is an enlarged-isolated perspective view of an alternative tensional retaining assembly including second tensional member 40b including elastic cord assemblies 44.

Referring to FIG. 22, depicted therein is an elevational cross-sectional view of alternative tensional retaining assembly with straps 42 taken along the 22-22 sectional arrows of FIG. 21 showing elastic cord assembly 44 including eighth frictional component 43h facing an interior surface of strap 42.

Figure 23:
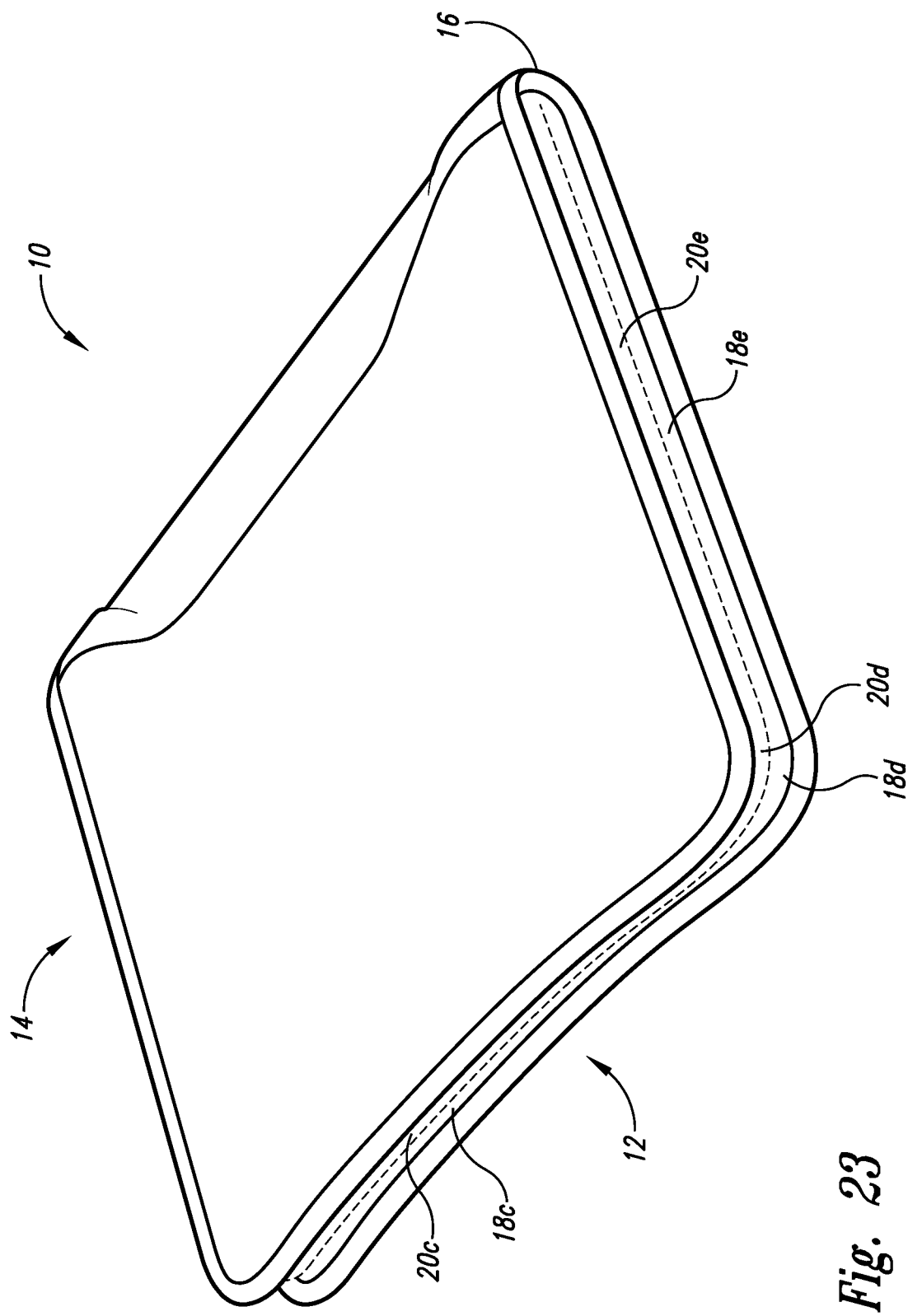
FIG. 23 is an exterior perspective view of portable device case shown in a closed disposition.

Referring to FIG. 23, depicted therein is an exterior perspective view of portable device case shown in a closed disposition.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device case comprising:
   a display case portion including an interior surface;
   a tensional retention assembly including a tensional member, a first clip, and a second clip, the tensional member including a first movable portion with a first end and a second movable portion with a second end, the first clip coupled to the first end of the first movable portion of the tensional member and the second clip coupled to the second end of the second movable portion of the tensional member, the tensional member having at least one coefficient of friction, the first clip having at least one coefficient of friction, and the second clip having at least one coefficient of friction;
   at least one frictional component coupled to at least a portion of the tensional retention assembly, the at least one frictional component having at least one coefficient of friction greater than the at least one coefficient of friction of the first clip, the at least one coefficient of friction of the second clip, and the at least one coefficient of friction of the tensional member;
   a keyboard case portion hingedly coupled to the display case portion;
   at least one strap coupled to a first portion of the interior surface of the display case portion, a first portion of the tensional member positioned between a portion of the at least one strap and a first portion of the interior surface of the display case portion; and
   at least one frictional component coupled to a least a portion of the at least one strap.

2. The portable electronic device case of claim 1 wherein the at least one strap includes an interior surface, the frictional component being coupled to the interior surface of the at least one strap.

3. The portable electronic device case of claim 1 wherein the at least one strap includes an exterior surface, the frictional component being coupled to the exterior surface of the at least one strap.

4. The portable electronic device case of claim 1 wherein the tensional member comprises at least one elastic band wherein the at least one frictional component being coupled to the at least one elastic band.

5. The portable electronic device case of claim 1 wherein the at least one frictional component of the tensional retention assembly includes at least one frictional component segment.

6. The portable electronic device case claim 5 wherein the at least one frictional component segment includes a plurality of rows of frictional component segments.

7. The portable electronic device case of claim 5 wherein the at least one frictional component segment includes an angled-dash pattern.

8. The portable electronic device case of claim 5 wherein the at least one frictional component segment includes a curvilinear pattern.

9. The portable electronic device case of claim 5 wherein the at least one frictional component segment includes a cross pattern.

10. The portable electronic device case of claim 1 wherein the first clip includes a spine, a first wall, and a second wall, the first wall and the second wall extending from the spine thereby forming a slot, the first wall having an external surface wherein the at least one frictional component being coupled to the exterior surface of the first wall.

11. The portable electronic device case of claim 9 wherein the slot of the first clip is sized to receive a first portion of a display of a portable electronic device, the first wall having an interior surface, the at least one frictional component being coupled to the interior surface of the first wall.

12. The portable electronic device case of claim 1 wherein the keyboard case portion includes at least one corner-holder-material including an interior surface, the at least one frictional component being coupled to the interior surface of the at least one corner-holder-material.

13. The portable electronic device case of claim 1 wherein the at least one frictional component includes a silicone material.

14. The portable electronic device case of claim 1 wherein at least one frictional component includes a material having a coefficient of friction at least 0.9.

* * * * *